Aug. 30, 1955 G. F. WIKLE 2,716,437
TIRE BUILDING APPARATUS
Filed Feb. 13, 1953 4 Sheets-Sheet 1

INVENTOR.
GEORGE F. WIKLE
BY Irwin M. Lewis
ATTORNEY.

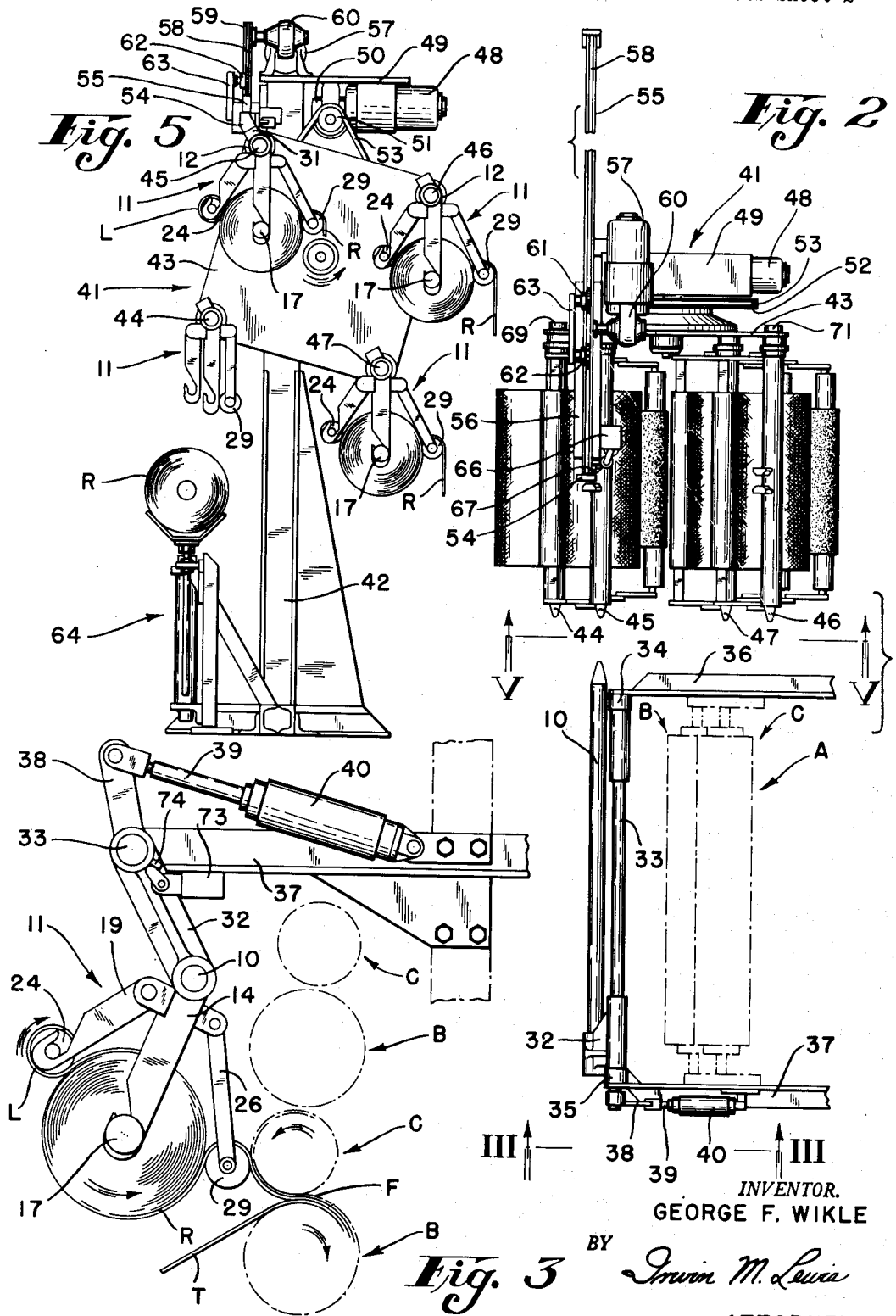

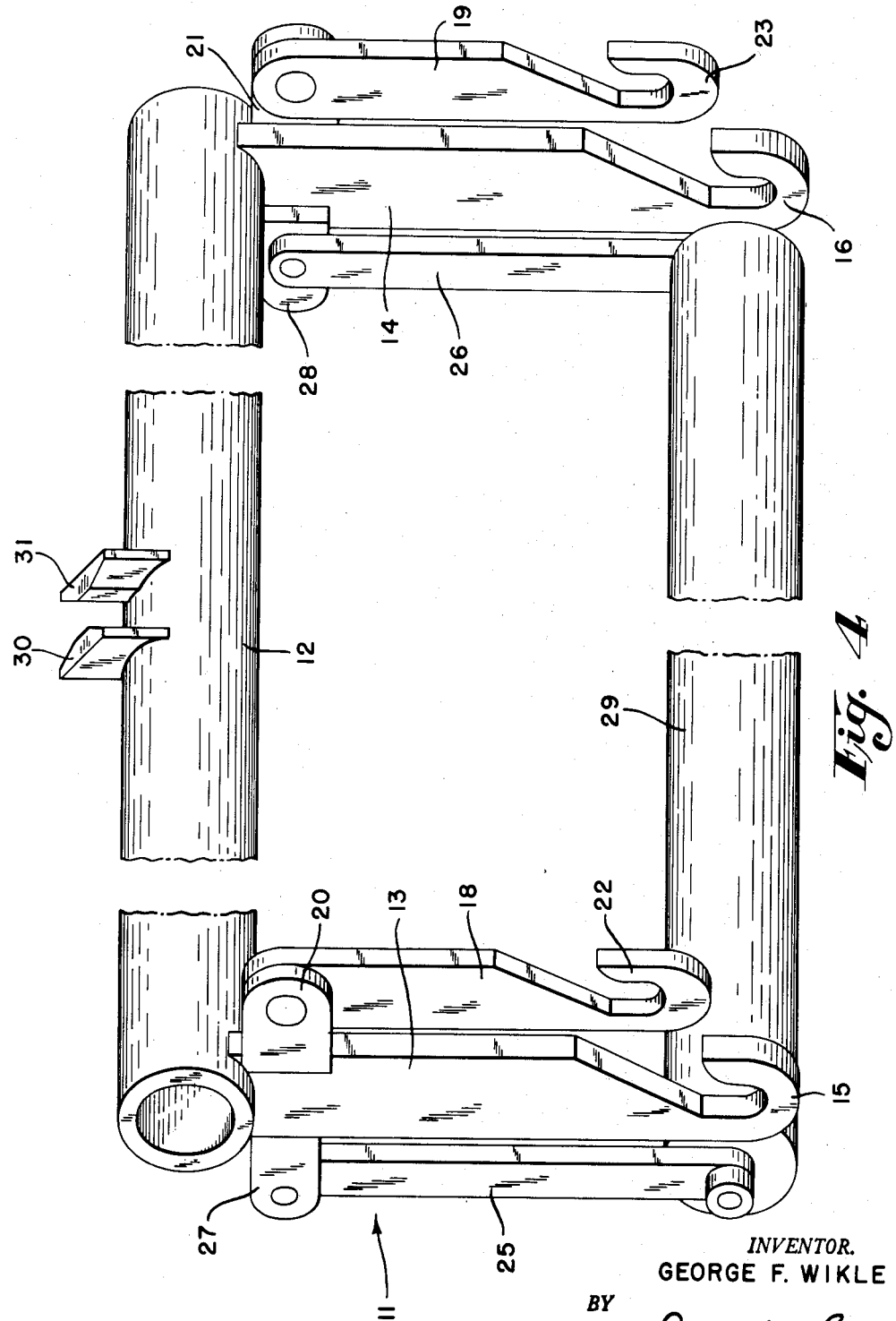

INVENTOR.
GEORGE F. WIKLE
BY
Irwin M. Lewis
ATTORNEY.

United States Patent Office 2,716,437
Patented Aug. 30, 1955

2,716,437
TIRE BUILDING APPARATUS

George F. Wikle, Detroit, Mich., assignor to United States Rubber Company, New York, N. Y., a corporation of New Jersey Application February 13, 1953, Serial No. 336,693

17 Claims. (Cl. 154—10)

This invention relates to a machine for applying a rubber strip, commonly known as a re-coat or squeegee strip, to a strip of tire fabric. More particularly, it relates to apparatus for supporting a re-coat strip in roll form and for applying the re-coat strip to a strip of tire fabric as the tire fabric is wound with a strip of liner fabric on the supply roll of a servicing machine of the type, for example, as shown in U. S. Patent No. 2,242,810.

According to the invention, there is provided a novel carrier for supporting a roll of the re-coat strip. The carrier includes, as a part thereof, a liner fabric take-up roll which is adapted to be frictionally driven from the roll of re-coat strip to wind up liner fabric thereon as the re-coat strip is removed from the roll thereof. The carrier also includes a drive roll which when pressed against the liner fabric supply roll of a servicing machine serves to rotate the roll of re-coat strip so that the re-coat strip is unwound therefrom at the same linear speed as the liner fabric and tire fabric is wound on the stock roll of the servicing machine whereby stretching of either the re-coat strip or the tire fabric is prevented. A special support is provided on the servicing machine to support the carrier and to press the drive roll against the liner fabric supply roll of the servicing machine.

The apparatus of the invention also includes a special mechanism for supporting a plurality of these re-coat strip carriers and for moving the carriers sequentially onto the support on the servicing machine so that a new supply of re-coat strip is provided when the re-coat strip on one carrier is exhausted. This special mechanism permits the removal of a roll of liner fabric from one carrier and the loading of a roll of re-coat strip on such carrier, while re-coat strip is being removed from another carrier and being applied to the tire fabric as it is wound on the supply roll of the servicing machine. This mechanism also provides a storage means for various widths of re-coat strip which are necessary for application to various widths of tire fabric.

Other objects and advantages of the invention will become apparent from the following detailed description when read in conjunction with the accompanying drawings, wherein:

Fig. 2 is a top plan view of the apparatus shown in Fig. 1;

Fig. 3 is a view taken on the line III—III of Fig. 2, showing how the apparatus of the present invention applies a re-coat strip to a strip of tire fabric as the tire fabric is wound on the stock roll of the servicing machine;

Fig. 4 is an auxiliary elevational view of the novel carrier of the present invention showing the details thereof;

Fig. 5 is a view taken on the line V—V of Fig. 2 showing the loading machanism of the invention; and, Fig. 6 is a schematic drawing of the control circuit for the apparatus of the invention.

Figure 1:
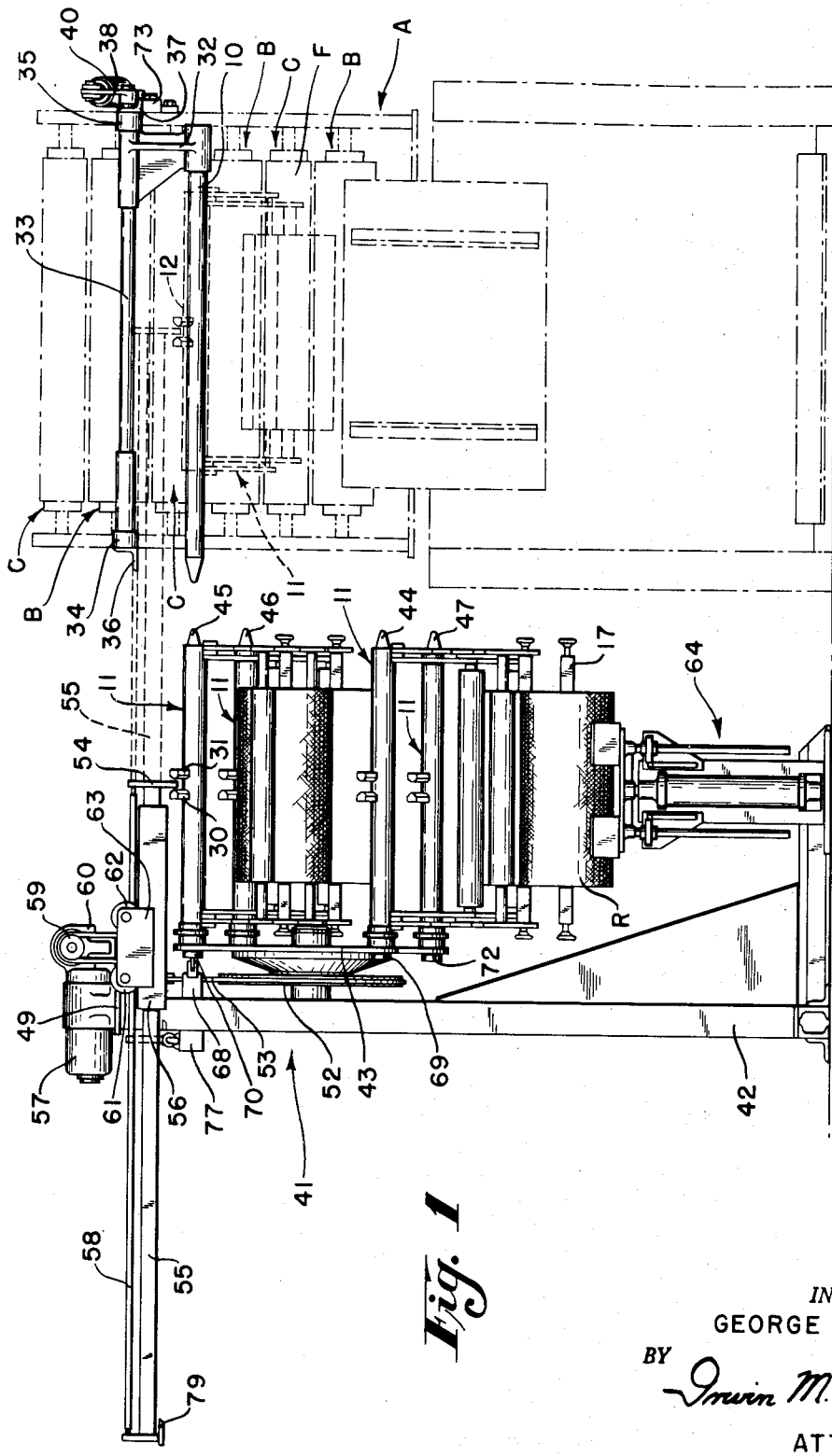
Fig. 1 is a front elevational view of the apparatus of the present invention as used in conjunction with a servicing machine; the servicing machine being shown in broken lines.

Referring to the drawings, and in particular to Figs. 1 and 2, there is shown the present invention as used in conjunction with a servicing machine, generally designated by the reference letter A. The servicing machine A which is shown in broken lines is of the type disclosed in U. S. Patent No. 2,242,810, previously referred to, and the details thereof form no part of the present invention except insofar as they cooperate with the elements of the present invention. As shown, the servicing machine A includes a number of stock rolls B and liner fabric supply rolls C upon each of the latter of which is wound a supply of liner fabric F. One end of the liner fabric F is attached to one of the stock rolls B so that when the roll B is rotated by driving means (as shown in the above-mentioned patent) to wind a length of tire fabric T thereon, the liner fabric F is drawn from the roll C and wound on roll B between adjacent turns of the tire fabric T. When one roll B has been loaded with tire fabric, the rolls as a group are shifted to bring another roll B into position to be loaded. It will be noted that the liner fabric F is drawn from the roll C at the same linear speed that the tire fabric is wound on the roll B. As will hereinafter be brought out, the apparatus of the present invention utilizes the movement of the liner fabric F in the feeding of a re-coat strip R (Fig. 3).

According to the invention, the servicing machine A is modified by the provision of a horizontally extending rod 10. The rod 10 extends in a direction parallel to and in front of the rolls B and C and serves, as will hereinafter be described in detail, to support a special carrier, generally designated by the reference numeral 11, upon which is supported a roll of re-coat strip R.

As best shown in Fig. 4, the carrier 11 includes an elongated sleeve 12 which is adapted to be slid over and supported on the rod 10. Rigidly secured to each end of the sleeve 12 are radially extending arms 13 and 14. The arms 13 and 14 have hook-shaped ends 15 and 16, respectively, which, as best shown in Fig. 3 are adapted to engage and rotatively support the ends of a mandrel 17 on which the re-coat strip R is wound. A second pair of arms 18 and 19 are pivotally attached to projections 20 and 21 secured respectively to arms 13 and 14 adjacent the point that they are secured to the sleeve 12. Arms 18 and 19 also have hook-shaped ends 22 and 23 respectively, which engage and rotatably support a liner fabric take-up roll 24 (Fig. 3) upon which liner fabric L, which is interposed between adjacent turns of the re-coat strip R as is conventional practice, is wound as the re-coat strip R is removed from the mandrel 17. It will be noted that the liner take-up roll 24 is normally urged toward the mandrel 17 by gravity and is frictionally driven by the roll of re-coat strip R as it is rotated when the re-coat strip R is drawn therefrom.

On the opposite side of the sleeve 12 from the arms 13 and 14, there is provided a third pair of arms 25 and 26 which are pivotally attached to projections 27 and 28 secured, respectively, to the arms 13 and 14. A drive roll 29 is rotatively secured at each end to the free ends of the arms 25 and 26 and serves when pressed between the liner fabric supply roll C and the roll of re-coat strip R to rotate the roll of re-coat strip R so that the re-coat strip R is unwound therefrom at the same linear speed as the liner fabric F is drawn from the liner fabric supply roll C.

A pair of spaced lugs 30 and 31 are secured to the sleeve 12 and, as will hereinafter be described in detail, are adapted to be engaged by a special mechanism which slides the carrier 11 on and off the rod 10. Referring to Figs. 1, 2 and 3, the rod 10 is secured at one end to an arm 32. Arm 32 in turn is secured to a shaft 33 and shaft 33 is rotatably journalled at each end in bearings 34 and 35. Bearings 34 and 35 are secured to angle iron members 36 and 37 which are attached to and extend from each side of the servicing machine A. A lever arm 38 is secured to the end of the shaft 33 and the free end thereof is pivotally attached to the end of a piston rod 39 of a fluid actuated cylinder 40. The cylinder 40 is pivotally attached to angle iron member 37.

Admission of fluid under pressure to the cylinder 40 to extend the piston rod 39 thereof serves to pivot the rod 10 towards the servicing machine A. When a carrier 11 is mounted on the rod 10, this pivotal movement of the rod 10 serves, as best shown in Fig. 3, to press the drive roll 29 between the liner fabric supply roll C and the roll of re-coat strip R. The re-coat strip R is threaded around the drive roll 29 between the drive roll 29 and the liner fabric supply roll C and is pressed against the liner fabric F on the supply roll C. The end of the liner fabric L, which is interposed between adjacent turns of the re-coat strip R, is wrapped around the liner fabric take-up roll 24. When the stock roll B is rotated to wind a strip of tire fabric T thereon, the liner fabric F is drawn from the liner fabric supply roll C and roll C is rotated thereby. As roll C rotates, the drive roll 29 is driven thereby and rotates the roll of re-coat strip R to feed the re-coat strip R at the same linear speed as the liner fabric F. The tacky re-coat strip R being pressed against the liner fabric F by the drive roll 29, is carried thereby and wound with and sticks to the tire fabric T on the stock roll B, as shown in Fig. 3. As the roll of re-coat strip R rotates it drives the liner fabric take-up roll 24 to wind the liner fabric L thereon.

Referring to Figs. 1, 2 and 5, a special loading mechanism, generally designated by the reference numeral 41, is positioned adjacent one side of the servicing machine A and serves to load and unload the carriers 11 from the rod 10. The mechanism 41 includes an upright standard 42 upon which is rotatably mounted a rectangular-shaped turret 43 which, as will hereinafter be brought out in detail, serves as a conveyor for conveying rolls of re-coat strip R from a loading position to a position of alignment with the rod 10. Secured to each of the four corners of the turret 43 and extending perpendicularly therefrom are four rods 44, 45, 46 and 47. A carrier 11 is slidably mounted on each of these rods. The rods 44, 45, 46 and 47 extend in a direction parallel to the rod 10 and are adapted to be moved sequentially into alignment with the free end of the rod 10 upon rotation of the turret 43 so that a carrier 11 may be slid off thereof and onto the horizontal rod 10 and so that a roll of re-coat strip R carried thereby may be applied to the tire fabric T as previously described. The turret 43 is adapted to be rotated to bring the rods 44, 45, 46 and 47 sequentially into alignment with the rod 10 by an electric motor 48 which is attached to a bracket 49 secured to the top of the standard 42. A driving connection is provided between the turret 43 and the motor 48 by a speed reducer 50 connected to the motor 48, a pulley 51 secured to the output shaft of the speed reducer, a pulley 52 secured to the turret 43, and a belt 53 interconnecting the two pulleys 51 and 52.

When the turret 43 is rotated to bring one of the rods 44, 45, 46 or 47 and a carrier 11 mounted thereon into alignment with the rod 10, a projecting dog 54 secured to the end of a reciprocable rod or push bar 55 is engaged between the spaced lugs 30 and 31 secured to the sleeve 12 of the carrier 11. The push bar 55 is slidably mounted in a bearing 56 secured to the standard 42 adjacent the top thereof. As best shown in Fig. 1, the push bar 55 is reciprocated by a motor 57 secured to the bracket 49. A driving connection is provided between the motor 57 and the push bar 55 by a belt 58 which is secured at each of its ends to the ends of the shaft 55 and which is trained around a driving pulley 59 secured to the output shaft of a speed reducer 60 and passes under two spaced idler pulleys 61 and 62 secured to a bracket 63 attached to the bearing 56. Operation of the motor 57 in one direction, therefore, moves the push bar 55 in a direction to slide a carrier 11 off one of the rods 44, 45, 46 or 47 and onto the rod 10 secured to the servicing machine A, as shown by the dashed lines in Fig. 1, so that a roll of re-coat strip R is supported by the carrier 11 may be applied to the tire fabric T. Operation of the motor 57 in the other direction serves to slide the carrier 11 off the rod 10 and back on one of the rods 44, 45, 46 or 47 after the re-coat strip R is exhausted.

A jack 64 positioned adjacent the loading mechanism 41 serves to lift a roll of re-coat strip R into position to be loaded on the arms 13 and 14 of one of the carriers 11 when it is in position above the jack 64. It is to be noted that one roll of re-coat strip R may be loaded on one carrier 11 while re-coat strip R is being removed from a roll thereof supported by another carrier positioned on the rod 10.

Control circuit and cycle of operation

Figure 6:
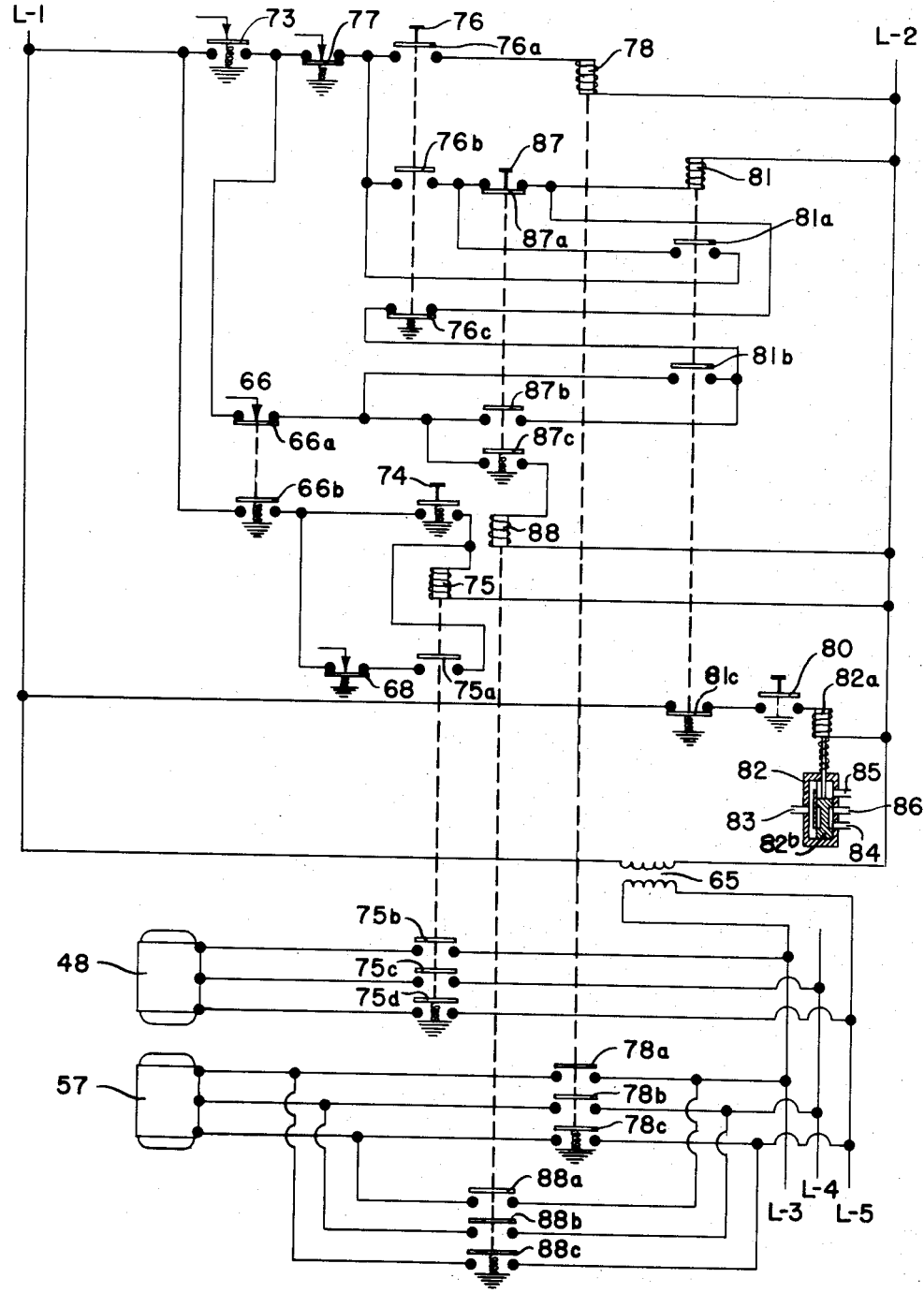

The control circuit for the apparatus is shown in Fig. 6. The complete circuit includes a two-wire 110 volt circuit L1, L2 and a three-wire 440 volt power circuit L3, L4, L5. The two-wire circuit L1, L2 derives its electrical energy from the three-wire circuit L3, L4, L5 by means of a transformer 65. The three-wire circuit L3, L4, L5 is energized from a suitable power source (not shown). In the drawing, all switches are shown in their normal or non-actuated position and all solenoids in a non-energized condition.

On initial operation all the carriers 11 are on the rods 44, 45, 46 and 47, the push bar 55 is in the fully retracted position; and the turret 43 is in a position with one of the rods 44, 45, 46 or 47, in alignment with the end of rod 10 of the servicing machine A. The rod 10 is in its most remote position from the rolls B and C.

The push bar 55 in the fully retracted position actuates a limit switch 66 to open its normally closed contacts 66a and close its normally open contacts 66b. Limit switch 66 is secured to bearing 56 (Fig. 2) and is operated by a block 67 secured to the push bar 55 adjacent the end thereof.

The turret 43 in the position in which one of the rods 44, 45, 46 or 47 is in alignment with the rod 10 actuates limit switch 68 to open the normally closed contacts thereof. Limit switch 68 is secured to the standard 42 and is actuated by any one of four blocks 69, 70, 71 and 72 secured to the turret 43 when any one of the rods 44, 45, 46 or 47 is in a position of alignment with the end of the rod 10.

When the rod 10 is in its most remote position from the rolls B and C, a limit switch 73 is actuated to close its normally open contacts. Limit switch 73 is secured to angle iron member 37 (Fig. 3) and is operated by a block 74 secured to the hub of lever arm 38.

Thus prior to starting a cycle of operation, normally closed contacts 66a of limit switch 66 are open and normally open contacts 66b are closed, normally closed contacts of limit switch 68 are open and normally opened contacts of limit switch 73 are closed.

Preparatory to operating the apparatus to apply a re-coat strip R to the tire fabric T, a roll of re-coat strip R, wound on a mandrel 17, and a liner take-up roll 24 is placed on each of the carriers 11 mounted on each of the rods 44, 45, 46 and 47. This is done by indexing the turret 43 to sequentially bring each of the rods 44, 45, 46 and 47 and the carriers 11 carried thereby to a position above the jack 64 so that a roll of re-coat strip R and a liner fabric take-up roll 24 can be placed on the carriers 11 supported thereby.

The turret 43 is indexed by momentarily pressing push switch 74 to close the contacts thereof. This completes a circuit through closed contacts 66b of limit switch 66 to energize a motor control relay 75 to close normally open contacts 75a, 75b, 75c and 75d thereof. Closing of contacts 75b, 75c and 75d completes a circuit to start motor 48 which rotates the turret 43 in the direction of the arrow shown in Fig. 5. As the turret begins to rotate, limit switch 68 is released and the contacts thereof close to provide a holding circuit through closed contacts 75a of motor control relay 75 and closed contacts 66b of limit switch 66 around push switch 74 so that motor relay 75 remains energized when push button 74 is released.

Motor 48 rotates turret 43 in the direction of the arrow shown in Fig. 5 until limit switch 68 is again actuated by one of the blocks 69, 70, 71 or 72 when one of the rods 44, 45, 46 and 47 comes into alignment with the end of the rod 10. Actuation of limit switch 68 opens the contacts thereof so that motor relay 75 is de-energized and contacts 75a, 75b, 75c and 75d open to stop motor 48 and therefore rotation of turret 43.

After a roll or re-coat strip R has been placed on the carriers 11 supported by the rods 44, 45, 46 and 47, the apparatus is ready to be operated to apply the re-coat strip R to the tire fabric T. To initiate this operation, the operator presses push switch 76 to close the normally opened contacts 76a, 76b and 76c thereof. Closing of contact 76a completes a circuit through closed contacts of limit switch 73 and normally closed contacts of a limit switch 77 to energize the motor control relay 78. Energization of motor control relay 78 closes normally open contacts 78a, 78b and 78c thereof to complete a circuit to start motor 57 to extend the push bar 55 towards the servicing machine A. The projecting dog 54 secured to the end of the push bar 55 being engaged between the lugs 30 and 31 secured to the sleeve 12 of the carrier 11 mounted on the particular rod 44, 46 or 47 which at that moment is in alignment with the rod 10, the carrier 11 and the roll of re-coat strip R carried thereby is slid off the particular rod 44, 45, 46 and 47 on which it is mounted and onto the rod 10 when the push bar 55 is extended by the operation of the motor 57. The operator continues to press the push switch 76 until limit switch 77 is actuated to open the normally closed contacts thereof so that motor control relay 78 is de-energized and contacts 78a, 78b and 78c open to stop motor 57. Limit switch 77 is secured to the standard 42 (Fig. 1) and is actuated by a block 79 secured to the end of the push bar 55 when the push bar 55 is in its fully extended position. When motor 57 stops upon the actuation of the limit switch 77, the operator releases the push switch 76 and presses push switch 80 to close the contacts thereof to complete a circuit through normally closed contacts 81c of a control relay 81 to energize the solenoid 82a of a solenoid operated valve 82. Should the operator accidentally release push button 76 and press push switch 80 before limit switch 77 is actuated, the pressing of push switch 80 would be ineffectual to energize solenoid 82a of the valve 82. This is because contacts 81a of relay 81 which were closed when relay 81 was energized upon the initial pressing of push switch 76 provides a holding circuit around the contacts 76b of push switch 76 and maintains relay 81 energized when push switch 76 is released. When relay 81 is energized, contacts 81c thereof are opened so that the circuit to the solenoid 80a is incomplete. When limit switch 77 is actuated and the contacts thereof open, the relay 81 is de-energized and the contacts 81c thereof close to permit energization of solenoid 82a by the closing of push switch 80.

Energization of solenoid 82a shifts the slide 82b of the valve 82 to connect a conduit 83 to a conduit 84 to admit fluid under pressure to cylinder 40 to extend piston rod 39 thereof. Conduit 83 is connected to a suitable source of fluid under pressure (not shown). The extension of the piston rod 39 pivots the rod 10 and carrier 11 supported thereby towards the liner fabric supply roll C of the servicing machine A so that the drive roll 29 is pressed between the roll of re-coat strip R and the liner supply roll C and the re-coat strip R is applied to the tire fabric T as shown in Fig. 3 and as previously described.

When all the re-coat strip R is exhausted, the operator releases the push switch 80 so that the contacts thereof open and solenoid 82a is de-energized and slide 82b of valve 82, being spring biased, returns to original position to admit fluid under pressure from conduit 83 through a conduit 85 to the cylinder 40 to retract the piston rod 29 thereof and to connect conduit 84 with exhaust port 86. Retraction of piston rod 39 pivots rod 10 and carrier 11 away from the liner supply roll C.

The limit switch 73 which was released to open the contacts thereof when the rod 10 was pivoted towards the liner fabric supply roll C by the cylinder 40 prevents motor 57 from being accidentally operated while the rod 10 and the carrier 11 are so pivoted towards the liner fabric supply roll C. The contacts of limit switch 73 are again closed when the rod 10 is pivoted away from the liner supply roll C.

The operator next presses a push switch 87 to open its normally closed contacts 87a and close its normally open contacts 87b and 87c. Closing of contacts 87c completes a circuit through contacts 66a of limit switch 66, which closed when the push bar 55 was extended, to energize a motor control relay 88. Energization of motor control relay 88 closes contacts 88a, 88b, and 88c thereof to complete a circuit to start operation of motor 57 in a direction to retract push bar 55. As push bar 55 retracts, it pulls the carrier 11 off the rod and onto the particular rod 44, 45, 46 or 47 which is in alignment with the rod 10. The operator continues to press push switch 87 until limit switch 66 is actuated by the block 67 secured to the end of the push bar 55 when the push bar 55 moves back to fully retracted position. When limit switch 66 is actuated, contact 66a thereof opens and motor control relay 88 is de-energized so that the contacts 88a, 88b and 88c thereof open and motor 57 stops.

Once push switch 87 has been pressed, it is impossible to actuate the valve 82 until the push bar 55 is fully retracted and has actuated limit switch 66. This is due to the fact that when push switch 87 is pressed, normally open contacts 87b thereof are closed to complete a circuit through closed contacts 66a of limit switch 66 and contacts 76c of push switch 86 to energize control relay 81. Energization of control relay 81 opens the normally closed contacts 81c thereof to open the circuit to the solenoid 82a of the valve 82 and prevent accidental actuation thereof. If push switch 87 is accidentally released before limit switch 66 is actuated, the contacts 81b of the relay 81 being closed provide a holding circuit around the contacts 87b to maintain relay 81 energized. Relay 81 is de-energized only when the push bar 55 is fully retracted so as to actuate limit switch 66 to open contacts 66a thereof.

When the shaft 55 is fully retracted and limit switch 66 has been actuated to stop motor 57, the operator presses push switch 74 to index the turret 43 in the manner as previously described, to bring another rod 44, 45, 46 and 47 and a new roll of re-coat strip R supported by a carrier 11 into alignment with the rod 10 and a cycle of operation as above described is repeated. While the new roll of re-coat strip R is being applied, the liner fabric take-up roll and the liner fabric removed from the re-coat strip previously applied may be removed from the carrier 11 and another roll of re-coat strip R and another liner fabric take-up roll 24 may be mounted on the carrier 11 which has been moved to a position above the jack 64.

From the above description, it can be seen that there is provided novel apparatus for supplying and applying re-coat strip to a length of tire fabric as the tire fabric is wound on the stock roll of a servicing machine. The apparatus permits the loading of one roll of re-coat strip in the apparatus while a second roll is being applied to the tire fabric. The re-coat strip is fed at the same linear rate as the tire fabric is wound on the stock roll of the service machine and the liner fabric interposed between adjacent turns of the re-coat strip is automatically separated from the re-coat strip and wound on a take-up roll. Both the roll of re-coat and the liner fabric take-up roll are frictionally driven from the liner supply roll of the servicing machine, thereby eliminating the necessity of a complicated expensive driving mechanism. While the apparatus has been described as used for applying a re-coat strip to a length of tire fabric, it is to be understood that it could be used for laminating other types of sheet or strip material.

It is to be understood that the above description and accompanying drawings is for the purpose of illustration only and not by way of limitation and changes or modifications may be made therein without departing from the spirit and the scope of the invention.

Having thus described my invention, what I claim and desire to protect by Letters Patent is:

1. In combination, a servicing machine having a stock roll, a liner fabric supply roll, and means for rotating said stock roll to wind a length of stock fabric and liner fabric thereon, a freely rotatable roll for carrying a wound-up length of re-coat strip, means for supporting said re-coat strip carrying roll in parallel relationship to said liner fabric supply roll, a freely rotatable drive roll supported between and in parallel relationship to said re-coat strip carrying roll and said liner fabric supply roll, means for urging said re-coat strip carrying roll towards said liner fabric supply roll so that said drive roll is pressed therebetween to provide a friction drive between said re-coat carrying roll and said liner fabric supply roll whereby the re-coat strip carried by said re-coat carrying roll is unwound from the re-coat carrying roll and applied to said stock roll at the same linear speed that the liner fabric is unwound from said liner fabric supply roll and wound on said stock roll.

2. In combination, a servicing machine having a stock roll, a liner fabric supply roll, and means for rotating said stock roll to wind a length of stock fabric and liner fabric thereon, a freely rotatable roll for carrying a wound-up length of re-coat strip, means for supporting said re-coat strip carrying roll in parallel relationship to said liner fabric supply roll, a freely rotatable drive roll supported between and in parallel relationship to said re-coat strip carrying roll and said liner fabric supply roll, means for urging said re-coat strip carrying roll towards said liner fabric supply roll so that said drive roll is pressed therebetween to provide a friction drive between said re-coat strip carrying roll and said liner fabric supply roll whereby the re-coat strip carried by said re-coat strip carrying roll is unwound from the re-coat strip carrying roll and supplied to said stock roll at the same linear speed that the liner fabric is unwound from said liner fabric supply roll and wound on said stock roll, a freely rotatable liner take-up roll supported in parallel relationship to said re-coat strip carrying roll and normally urged into frictional engagement with the re-coat strip carried by said re-coat strip carrying roll whereby it is rotated to wind up liner fabric from between adjacent turns of the re-coat strip as the re-coat strip is unwound from said re-coat strip carrying roll.

3. Apparatus for applying a re-coat strip to a strip of stock fabric as the stock fabric is wound with the length of liner fabric on the stock roll of a servicing machine comprising, a roll for carrying a wound-up length of re-coat strip, a freely rotatable liner fabric take-up roll supported in parallel relationship to said re-coat strip carrying roll and normally urged towards said re-coat carrying roll so as to be frictionally driven therefrom, a driving roll adapted to be frictionally driven from a liner fabric supply roll of said servicing machine supported in parallel relationship to said re-coat strip carrying roll on the opposite side thereof from said liner fabric take-up roll and normally urged towards said re-coat strip carrying roll to frictionally drive said re-coat strip carrying roll.

4. In combination with a servicing machine having a horizontal stock roll, a horizontal liner fabric supply roll, and means for rotating said stock roll to wind a length of stock fabric and liner fabric thereon, a horizontal support secured to said servicing machine in front of said stock roll and liner fabric supply roll, a roll for carrying a length of wound-up re-coat strip removably suspended from said horizontal support, a drive roll pivotally suspended from said horizontal support between said re-coat strip carrying roll and said liner supply roll and means for moving said support towards said liner supply roll to force said drive roll against said re-coat strip carrying roll and said liner supply roll to provide a driving connection between said re-coat strip carrying roll and said liner fabric supply roll so that the re-coat strip is unwound from said re-coat strip carrying roll and supplied to said stock roll at the same linear rate that the liner fabric is unwound from said liner fabric supply roll.

5. In combination with a servicing machine having a horizontal stock roll, a horizontal liner fabric supply roll, and means for rotating said stock roll to wind a length of stock fabric and liner fabric thereon, a horizontal rod secured at one end to said servicing machine and extending in parallel relationship to said stock roll and said liner fabric supply roll, an elongated sleeve, means secured to said sleeve for rotatably supporting a roll of re-coat strip, and means for sliding said sleeve on and off said rod.

6. In combination with a servicing machine having a horizontal stock roll, a horizontal liner fabric supply roll, and means for rotating said stock roll to wind a length of stock fabric and liner fabric thereon, a horizontal rod secured at one end to said servicing machine and extending in parallel relationship to said stock roll and said liner fabric supply roll, a sleeve, means secured to said sleeve for rotatably supporting a roll of re-coat strip, a liner fabric take-up roll pivotally attached to said sleeve, and means for sliding said sleeve on and off said rod.

7. In combination with a servicing machine having a horizontal stock roll, a horizontal liner fabric supply roll, and means for rotating said stock roll to wind a length of stock fabric and liner fabric thereon, a horizontal rod secured at one end to said servicing machine and extending in parallel relationship to said stock roll and said liner fabric supply roll, a sleeve means secured to said sleeve for supporting a roll of re-coat strip, a liner fabric take-up roll pivotally secured to said sleeve on one side of said re-coat strip roll supporting means and a drive roll pivotally attached to said sleeve on the other side of said re-coat roll supporting means, and means for sliding said sleeve on and off said rod.

8. In combination with a servicing machine having a horizontal stock roll, a horizontal liner fabric supply roll, and means for rotating said stock roll to wind a length of stock fabric and liner fabric thereon, a horizontal rod secured at one end to said servicing machine and extending in parallel relationship to said stock roll and said liner fabric supply roll, a sleeve, means secured to said sleeve for rotatably supporting a roll of re-coat strip, means for moving said sleeve from a loading station where a roll of re-coat strip may be mounted on said means secured to said sleeve to a position in alignment with the other end of said horizontal rod, and means for sliding said sleeve on said rod.

9. In combination with a servicing machine having a horizontal stock roll, a horizontal liner fabric supply roll, and means for rotating said stock roll to wind a length of stock fabric and liner fabric thereon, a horizontal rod secured at one end to said servicing machine and extending in parallel relationship to said stock roll and said liner fabric supply roll, a sleeve, means secured to said sleeve for rotatably supporting a roll of re-coat strip, a liner fabric take-up roll pivotally suspended from said sleeve on one side of said means for supporting a roll of re-coat strip, means for moving said sleeve from a loading station where a roll of re-coat strip may be mounted on said means secured to said sleeve to a position in alignment with said horizontal rod, and means for sliding said sleeve on said rod.

10. In combination with a servicing machine having a horizontal stock roll, a horizontal liner fabric supply roll, and means for rotating said stock roll to wind a length of stock fabric and liner fabric thereon, a horizontal rod secured at one end to said servicing machine, and extending in parallel relationship to said stock roll and said liner fabric supply roll, a sleeve, and means secured to said sleeve for rotatably supporting a roll of re-coat strip, a liner fabric take-up roll pivotally suspended from said sleeve on one side of said means secured to said sleeve, a drive roll pivotally suspended from said sleeve on the other side of said means secured to said sleeve, means for moving said sleeve from a loading station where a roll of re-coat strip may be loaded on said means secured to said sleeve to a position in alignment with said horizontal rod, and means for sliding said sleeve on said rod.

11. In combination with a servicing machine having a horizontal stock roll, a horizontal liner fabric supply roll, and means for rotating said stock roll to wind a length of stock fabric and liner fabric thereon, a horizontal rod secured at one end to said servicing machine and extending in parallel relationship to said stock roll and said liner fabric supply roll, a sleeve, means secured to said sleeve for rotatably supporting a roll of re-coat strip, a freely rotatable liner fabric take-up roll pivotally suspended from said sleeve on one side of said means secured to said sleeve, a freely rotatable drive roll pivotally suspended from said sleeve on the other side of said means secured to said sleeve, means for moving said sleeve from a loading station where a roll of re-coat strip may be placed on said means secured to said sleeve to a position in alignment with said horizontal rod, means for sliding said sleeve on said horizontal rod when it is in said aligned position, means for moving said horizontal rod towards said liner fabric supply roll after said sleeve has been slid thereon to bring said driving roll into driving engagement with said liner fabric carried by said liner fabric supply roll.

12. In combination with a servicing machine having a horizontal stock roll, a horizontal liner fabric supply roll, and means for rotating said stock roll to wind a length of stock fabric and liner fabric thereon, a horizontal rod secured at one end to said servicing machine and extending in parallel relationship to said stock roll and said liner fabric supply roll, a turret rotatably mounted at one side of said servicing machine, a plurality of rods secured to said turret at spaced points and extending therefrom in a direction parallel to said horizontal rod secured to said servicing machine, means for indexing said turret to bring said rods secured to said turret sequentially into alignment with the end of said rod secured to said servicing machine, a sleeve slidably mounted on each of said rods secured to said turret, means secured to each of said sleeves for supporting a roll of re-coat strip, means for sliding each of said sleeves off of said rod on which it is mounted onto said rod secured to said servicing machine when said rod on which it is mounted is in alignment with said rod secured to said servicing machine so that the re-coat strip supported thereon may be applied to said stock fabric as it is wound on said stock roll.

13. In combination, with a servicing machine having a horizontal stock roll, a horizontal liner fabric supply roll, and means for rotating said stock roll to wind a length of stock fabric and liner fabric thereon, a horizontal rod secured at one end to said servicing machine and extending in parallel relationship to said stock roll and said liner fabric supply roll, a turret rotatably mounted at one side of said servicing machine, a plurality of rods secured to said turret at spaced points and extending therefrom in a direction parallel to said horizontal rod secured to said servicing machine, means for indexing said turret to bring said rods secured to said turret sequentially in alignment with the end of said rod secured to said servicing machine, a sleeve slidably mounted on each of said rods secured to said turret, means secured to each of said sleeves for supporting a roll of re-coat strip, a freely rotatable drive roll pivotally suspended from each of said sleeves on one side of said means secured to said sleeve, a liner fabric take-up roll pivotally suspended from each of said sleeves on the other side of said means secured to each sleeve, means for sliding each of said sleeves off of said rod on which it is mounted onto said rod secured to said servicing machine when said rod on which it is mounted is in alignment with said rod secured to said servicing machine, means for moving said horizontal rod towards said liner fabric supply roll when one of said sleeves is mounted thereon to thereby press said drive roll against said liner fabric roll to provide a driving connection between it and the re-coat strip supported by said means secured to said sleeve so that the re-coat strip is unwound at a linear speed equal to that at which said liner fabric is unwound from said liner fabric supply roll and wound on said stock roll.

14. In combination, an elongated sleeve, a pair of spaced arms secured to and extending from said sleeve, means carried by said arms for rotatably supporting a roll, a second pair of arms pivotally attached to said sleeve at one side of said sleeve, means carried by said second pair of arms for supporting a second roll, a third pair of arms pivotally attached to said sleeve on the other side of said first set of arms, and a roll rotatably attached at each end to said third pair of arms.

15. In combination with a servicing machine having a horizontal stock roll, a horizontally extending support secured to said servicing machine adjacent said stock roll, a movable conveyor, means secured to said conveyor for supporting a roll of re-coat, means for moving said conveyor to move said roll of re-coat strip from a loading station to a position adjacent said support, and means for moving the roll of re-coat strip off of said conveyor onto said support.

16. In combination, a support, a turret rotatably mounted on said support, a plurality of rods secured to said turret and extending therefrom, means slidably mounted on each of said rods for supporting a strip of material in roll form, means for indexing said turret to move said means carried by said rods from a loading station to an unloading station, a push bar slidably mounted for reciprocal movement on said support at said unloading station and engageable with said means carried by said rods when said means are at the unloading station, and means for reciprocating said push bar to slide said means mounted on said rods off of said rods.

17. In combination, a support, a turret rotatably mounted on said support, a plurality of rods secured to said turret and extending therefrom, a sleeve slidably mounted on each of said rods, means carried by each sleeve for supporting a strip of material in roll form, means for indexing said turret to move each rod and the sleeve mounted thereon from a loading station to an unloading station, a push bar slidably mounted for reciprocal movement on said support at said unloading station, means carried by each sleeve engageable with said push bar when the rod it is mounted on is at said unloading station, and means for reciprocting said push bar to slide each sleeve off of the rod it is mounted on when the rod it is mounted on is at the unloading station.

References Cited in the file of this patent

UNITED STATES PATENTS

| | | |
|---|---|---|
| 1,825,783 | Dunning et al. | Oct. 6, 1931 |
| 1,988,439 | Coe | Jan. 22, 1935 |
| 2,045,534 | Stevens | June 23, 1936 |
| 2,242,810 | Bostwick | May 20, 1941 |
| 2,441,791 | Bostwick | May 18, 1948 |
| 2,558,903 | Kastner | July 3, 1951 |
| 2,605,196 | Bostwick | July 29, 1952 |
| 2,668,572 | Bostwick | Feb. 9, 1954 |